United States Patent

Mix

[11] Patent Number: 5,578,254
[45] Date of Patent: Nov. 26, 1996

[54] STRUCTURED PACKING ELEMENTS

[76] Inventor: Thomas W. Mix, 28 Atwood St., Wellesley, Mass. 02181

[21] Appl. No.: 422,047

[22] Filed: Apr. 14, 1995

Related U.S. Application Data

[63] Continuation-in-part of Ser. No. 149,082, Nov. 9, 1993, Pat. No. 5,407,607.

[51] Int. Cl.$^6$ ........................................................ B01F 3/04
[52] U.S. Cl. ............................................................ 261/112.2
[58] Field of Search .............................................. 261/112.2

[56] References Cited

U.S. PATENT DOCUMENTS

| | | |
|---|---|---|
| 1,887,704 | 11/1932 | Wilisch . |
| 2,206,440 | 7/1940 | Walker . |
| 3,051,453 | 8/1962 | Sluijters . |
| 3,151,675 | 10/1964 | Lysholm . |
| 3,235,234 | 2/1966 | Beaudoin . |
| 3,266,787 | 8/1966 | Eckert . |
| 3,433,692 | 3/1969 | Gewiss . |
| 3,485,485 | 12/1969 | Faigle . |
| 3,589,687 | 6/1971 | Leybourne, III . |
| 3,618,910 | 11/1971 | Arndt . |
| 3,620,506 | 11/1971 | So . |
| 3,664,638 | 5/1972 | Grout . |
| 3,679,537 | 7/1972 | Huber et al. . |

(List continued on next page.)

FOREIGN PATENT DOCUMENTS

| | | |
|---|---|---|
| 211999 | 3/1956 | Australia . |
| 717195 | 6/1968 | Belgium . |
| 566518 | 11/1958 | Canada . |
| 0069241 | 6/1982 | European Pat. Off. . |
| 0170402 | 2/1986 | European Pat. Off. . |
| 1026320 | 4/1953 | France . |
| 2130621 | 3/1972 | France . |
| 684870 | 12/1939 | Germany . |
| 2060178 | 12/1970 | Germany . |
| 2208226 | 2/1972 | Germany . |
| 3140640 | 10/1981 | Germany . |
| 3222892 | 6/1982 | Germany . |
| 3901213 | 7/1990 | Germany .......................... 261/112.2 |

(List continued on next page.)

OTHER PUBLICATIONS

W. Meier et al., "Performance Characteristics of New High Efficiency High Capacity Oriented Lamellar Packing (Flexipac)", National A.I.Ch.E. Meeting, Mar. 20–24, 1977.
Van Winkle, *Distillation*, McGraw Hill, Inc., New York, 1967, p. 606.

(List continued on next page.)

*Primary Examiner*—Tim R. Miles
*Attorney, Agent, or Firm*—Fish & Richardson P.C.

[57] ABSTRACT

A packing element for enhancing contact between a first fluid having a predominant direction of flow and a second fluid comprises a plurality of adjacently disposed layers of material, each of which is disposed generally in a plane aligned with the direction of flow. The layers each include a plurality of rows of fluid-deflecting corrugations that project out of the plane of the layer, and each of the corrugations include a pair of oppositely-inclined surfaces that define an elongated vertex oriented in a diagonal direction with respect to the predominant flow direction. In one configuration, each corrugation is arranged so that its pair of surfaces are at least partially offset from each other along the diagonal direction. In another configuration, the corrugations have two pairs of oppositely-inclined surfaces that define the elongated, diagonal vertex, and the surfaces in each pair are at least partially offset from each other along the diagonal. In a third configuration, the corrugations include: (1) a pair of oppositely-inclined surfaces that define an elongated, diagonal vertex and that are at least partially offset from each other along the diagonal direction, and (2) a pair of oppositely-inclined elements having a different inclination than that of the pair of surfaces, with each element defining at least one opening through which fluid passes.

28 Claims, 7 Drawing Sheets

U.S. PATENT DOCUMENTS

| | | |
|---|---|---|
| 3,704,869 | 12/1972 | Priestley . |
| 3,752,453 | 8/1973 | Doyne . |
| 3,775,234 | 11/1973 | Rich . |
| 3,887,664 | 6/1975 | Regehr . |
| 3,963,810 | 6/1976 | Holmberg . |
| 3,997,632 | 12/1976 | Kloss . |
| 4,027,058 | 5/1977 | Wootten . |
| 4,041,113 | 8/1977 | McKeown . |
| 4,067,936 | 1/1978 | Ellis . |
| 4,128,684 | 12/1978 | Bomio . |
| 4,179,222 | 12/1979 | Strom . |
| 4,186,159 | 1/1980 | Huber . |
| 4,195,043 | 3/1980 | Foote et al. . |
| 4,197,264 | 4/1980 | Degg . |
| 4,202,847 | 5/1980 | Ernst et al. . |
| 4,203,934 | 5/1980 | Leva . |
| 4,203,935 | 5/1980 | Hackenjos . |
| 4,277,425 | 7/1981 | Leva . |
| 4,296,050 | 10/1981 | Meier ................................. 261/112.2 |
| 4,324,749 | 4/1982 | Bronner . |
| 4,333,892 | 6/1982 | Ellis et al. . |
| 4,366,608 | 1/1983 | Nagaoka . |
| 4,374,542 | 2/1983 | Bradley . |
| 4,396,058 | 8/1983 | Kurschner et al. . |
| 4,496,498 | 1/1985 | Pluss . |
| 4,597,916 | 7/1986 | Chen . |
| 4,600,544 | 7/1986 | Mix . |
| 4,604,247 | 8/1986 | Chen . |
| 4,670,196 | 6/1987 | Hsia . |
| 4,701,287 | 10/1987 | Manteufel . |
| 4,710,326 | 12/1987 | Seah . |
| 4,740,334 | 4/1988 | Rukovena . |
| 5,158,712 | 10/1992 | Wilhelm . |

FOREIGN PATENT DOCUMENTS

| | | |
|---|---|---|
| 772572 | 10/1980 | U.S.S.R. . |
| 1311767 | 5/1987 | U.S.S.R. . |
| 1004046 | 9/1965 | United Kingdom . |
| 1386955 | 3/1975 | United Kingdom . |
| 1573745 | 8/1980 | United Kingdom . |
| 84/02088 | 6/1984 | WIPO . |
| 90/13354 | 11/1990 | WIPO . |

OTHER PUBLICATIONS

Koch, Flexipac, "Tower Packing for Absorption, Distillation, Extraction, Heat Transfer biological Media for Aerobic and Anaerobic Water Purification", Bul. KFP–2.

Koch Sulzer Services, Koch Sulzer Rectification Columns, Bul. KS–1.

Chem–Pro/Montz, "$A_2$\High Efficiency/Low Pressure Drop Tower Packing", Bulletin HV–610.

Chen et al., "Development of a New Generation of High Efficiency Packng for Mass Transfer Operations", Glitsch, Inc., Dallas, TX, Nov. 14–19, 1982.

Norton, "Liquid Distributors", brochure, Dec. 1976.

Chem Show Preview, advertisement, Chemical Engineering, p. 144, #A479 (Nov. 14, 1983).

Newsfront, "Structured is the Byword in Tower–Packing World", Chemical Engineering, Mar. 4, 1985, pp. 22–25.

Newsfront, "Boosting Tower Performance by More Than a Trickle", *Chemical Engineering*, May 27, 1985, pp. 22–27.

"Structured Packings", *The Chemical Engineer*, Aug. 1988, pp. 28–30.

STRUCTURED PACKING ELEMENTS

CROSS-REFERENCE TO RELATED APPLICATIONS

This application is a continuation-in-part of copending application Serial No. 08/149,082, filed Nov. 9, 1993 (hereinafter, the "Parent Application"), now U.S. Pat. No. 5,407,607, which is incorporated herein by reference.

BACKGROUND OF THE INVENTION

This invention relates to structured packing elements for enhancing contact between fluids.

Various types of exchange columns have been known in which a gas and a liquid (i.e., fluids) come into contact with another, preferably in countercurrent flow. In some cases, use has been made of structured packing elements formed of layers of material (such as plates) that are generally disposed in a plane parallel to the column axis, and that include corrugations which project out of the plane of the layers in order to encourage contact between the liquid and gas. Adjacent layers contact one another at the corrugations. In such cases, the corrugations (which resemble folds in the layers) are disposed at a suitable angle (such as diagonally) to the column axis. Often, the layers also include horizontal fluting to further enhance fluid contact.

In some schemes, each corrugation continues uninterrupted along its entire length, and adjacent corrugations are disposed on opposite sides of the plane of the layer. Thus, the adjacent corrugations respectively resemble diagonal ridges and valleys on the plate. In other arrangements, each corrugation is comprised of a row of corrugations that alternately project oppositely from the plane of the layer so that the corrugations in the row alternate between ridges and valleys along the diagonal. In this latter case, it is seen that flow along a ridge becomes flow along a valley, and vice versa, to increase turbulence and vapor and liquid uniformity along a horizontal cross-section. At the ridge-valley interfaces, liquid flow is displaced from the layer and does not immediately return to the layer.

The corrugated layers are typically made from various materials, for example, textile fabrics (i.e, gauze) stiffened by interwoven metal wires, metallic fabric, fiberglass, plastic, ceramic, or sheet metal. Generally, packing elements which are made of foil-like material, such as sheet metal, are cheaper to produce than packing elements which are made of a self-wetting woven fabric. However, uniform distribution of the liquid (which is important for effective mass transfer or heat exchange with a gas phase) over the surface of a plate of foil-like material may not occur, because capillary forces may not come into operation.

Similarly, vapor flow up through the corrugations is sensitive to pressure differentials, generated in part by non-turbulent flow, pressure drag due to the generation of normal stresses in the flow, and non-homogeneous flow patterns through the grid structure. In sections of the flow up through a corrugation, flow tends to be more laminar going up the valley of a corrugation and turbulent where it is crossing a corrugation. Frictional drag along all channels and all adjacent openings provides uniformity and less propensity for fluid displacement and maldistribution or channeling of either the vapor or the liquid through certain portions of the packing element grid or its layers. Such dynamic action directly affects efficiency and mass heat interaction.

In some packing elements, the absence of any substantial degree of uniformly imparted frictional drag, generated by tangential stresses, through the adjacent corrugations and fluted areas decreases the uniformity and homogeneity of the flow pattern throughout the grid and reduces the efficiency and mass heat transfer characteristics of the packing.

SUMMARY OF THE INVENTION

This invention features several alternative configurations of layers of material for structured packing elements. The layers are optimized for the purpose of mixing two fluids (e.g., a gas and a liquid) that flow in opposite directions through a distillation column. The layers described herein are designed so as to efficiently disperse the liquid as it passes in a dominant flow direction (e.g., downwardly through the column), while also allowing the gas to pass, e.g., upwardly through the column with minimal resistance. As a result, high mass transfer rates of the fluids through the column and high throughput are sustained.

In one general aspect of the invention, each packing element layer includes a plurality of rows of fluid-deflecting corrugations that project out of the plane of the layer, each of the corrugations including a pair of oppositely-inclined surfaces that define an elongated vertex oriented in a diagonal direction with respect to the predominant flow direction, and each corrugation being configured so that its pair of surfaces are at least partially offset from each other along the diagonal direction.

Preferred embodiments include the following features.

The pair of surfaces are in alignment with each other along the diagonal direction at a shared region of the elongated vertex. In one configuration, the shared region is one-half of the length of the pair of surfaces; in another, the shared region is one-quarter of that length.

In some embodiments, each row of corrugations is arranged so that the diagonal directions of the elongated vertices of at least some of the corrugations are staggered from each other. Preferably in these embodiments, the diagonal directions of the elongated vertices of all corrugations in the row are staggered from each other.

Each corrugation also comprises a second pair of oppositely-inclined surfaces that define the elongated vertex. The second pair of surfaces have a different inclination than the first-mentioned pair of surfaces and are offset from each other by the first-mentioned pair of surfaces. The lengths of the second pair of surfaces along the diagonal direction are different in adjacent corrugations in each row. In one embodiment, the lengths of the second pair of surfaces of a first corrugation in each row exceed the lengths of said first pair of surfaces of that corrugation, and the lengths of the second pair of surfaces of a second, adjacent corrugation are less than the lengths of the first pair of surfaces of that corrugation. In each row, corrugations with the configuration of the first corrugation alternate with corrugations having the configuration of the second corrugation.

Preferably, the second pair of surfaces are more steeply inclined than the first pair of surfaces with respect to the plane of the layer. For example, the first pair of surfaces are inclined at between 7.5 degrees and 37.5 degrees, and the second pair of surfaces are inclined at between 52.5 degrees and 80 degrees.

The layer further includes apertures disposed between the corrugations in each row, and apertures located between the first and second surfaces of each one of the corrugations. The rows of corrugations are staggered so that at least some of the apertures are vertically aligned.

In another embodiment, the rows of corrugations are arranged so that the diagonal directions of the elongated vertices of at least some—and preferably all—of the corrugations in each row are in alignment with each other. In this configuration, each corrugation also comprises a pair of oppositely-inclined elements having a different inclination than the first-mentioned pair of surfaces, and each element defines at least one opening through the corrugation through which fluid passes. Preferably, the pair of elements are offset from each other by the pair of surfaces, and the length of each element is less than that of the pair of surfaces.

In one configuration, at least some of the elements include a single member having a pair of said openings disposed on each side thereof along the diagonal direction. Alternatively, at least some of the elements include a pair of members disposed on opposite sides of a the opening along the diagonal direction.

The pair of surfaces of each corrugation are inclined at an acute angle (e.g., between 20 degrees and 60 degrees) and the elements are oriented perpendicularly to the plane of the layer.

In another general aspect of the invention, each of the corrugations includes two pairs of oppositely-inclined surfaces that define an elongated, diagonal vertex, and the surfaces in each pair are at least partially offset from each other along the diagonal.

In preferred embodiments, the pairs of surfaces have different lengths along the diagonal direction and have different inclinations with respect to the plane of the layer. Each row of corrugations is arranged so that the diagonal directions of the elongated vertices of all corrugations in the row are staggered from each other.

Yet another general aspect of the invention features configuring the corrugations to include: (1) a pair of oppositely-inclined surfaces that define an elongated, diagonal vertex and that are at least partially offset from each other along the diagonal direction, and (2) a pair of oppositely-inclined elements having a different inclination than that of the pair of surfaces, with each element defining at least one opening through which fluid passes.

Preferred embodiments include the following features.

The pair of surfaces of each corrugation are inclined at an acute angle with respect to the plane of the layer, and the elements are oriented perpendicularly to the plane. Each row of corrugations is arranged so that the diagonal directions of the elongated vertices of all corrugations in the row are aligned with each other.

The offset nature of the corrugations of my packing element layers provides a series of "drip point edges" which are discontinuous with, and at different angles to, adjacent parts of the layers. The apertures (which are preferably disposed between the drip point edges) disrupt and generate mixing in the flow of the liquid along the corrugations, while providing relatively unimpeded passage of the gas through the column.

Generally, liquid flowing down each packing element layer in the column branches out into a laminar film as the liquid flows across the laterally expanding surfaces of the corrugations, and the liquid collects and flows downwardly along drip point edges of a corrugation surface until a connecting passage is reached which connects the packing structure above the drip point edges with that below it. The liquid then funnels down this passage to the structure beneath. The liquid branching and collecting process then begins anew.

In this manner, the liquid is continually dispersed throughout the column, mixing with the counter-traveling vapor as the latter passes up through the packing. This continual liquid expansion and collection process mixes the liquid with the vapor, while maintaining a high mass transfer rate through nearly vertical apertures.

The frequent breaks, or drip point edges, in the liquid and vapor flow paths in the offset configuration of some embodiments provide multiple advantages. First, the mixing of the vapor and liquid stream is enhanced. At low liquid flow rates, the liquid collects on the corrugation surfaces, coalescing when the flow reaches the edge of the surface, or "drip point" and then channeling through a bridge connecting the drip point with the packing structure beneath. At higher liquid flow rates, the liquid momentum reaching the downwardly sloping drip point may be sufficient to cause some of the liquid to drip or flow from the upper portions of the drip point edge to the structure below, before the liquid reaches the bridge. Interruption of the boundary layers also improves efficiency, especially in applications where the liquid Reynolds number ranges between high laminar and low turbulent flow conditions, e.g., from 500, where the flow is predominantly laminar to about 15,000 where turbulence dominates. (See *Compact Heat Exchangers*, 3rd Edition, W. M. Kays and A. L. London, McGraw-Hill Book Company, 1984, p. 6., for a discussion of Reynolds number.)

A second advantage of the offset configuration is that the vapor phase pressure drop can be substantially reduced. The offset provides numerous apertures through which the vapor passes, enabling essentially unimpeded travel of vapor upwardly through the column. Because the offsets generally succeed in preventing passage of liquid directly through the apertures, the angle at which the vapor flow up through the packing can more closely approach true vertical by flowing through these offset apertures. As a result, vapor pressure drop is dramatically lower than that typically obtained with conventional cross-corrugated structured packing, in which the vapor flow must zigzag up through the diagonals of the corrugations (which typically have a 45° inclination).

A third advantage of the invention is that the edges of oppositely-inclined corrugation surfaces overlap along the elongated vertex, thus strengthening the layer and increasing its durability for repeated use.

In addition, the vertices of the offset configuration are preferably oriented so that all gas and liquid flowing through the system has equivalent contact with the packing element.

Other features and advantages of the invention become apparent from the following detailed description, and from the claims.

DESCRIPTION OF THE PREFERRED EMBODIMENTS

Figure 1:
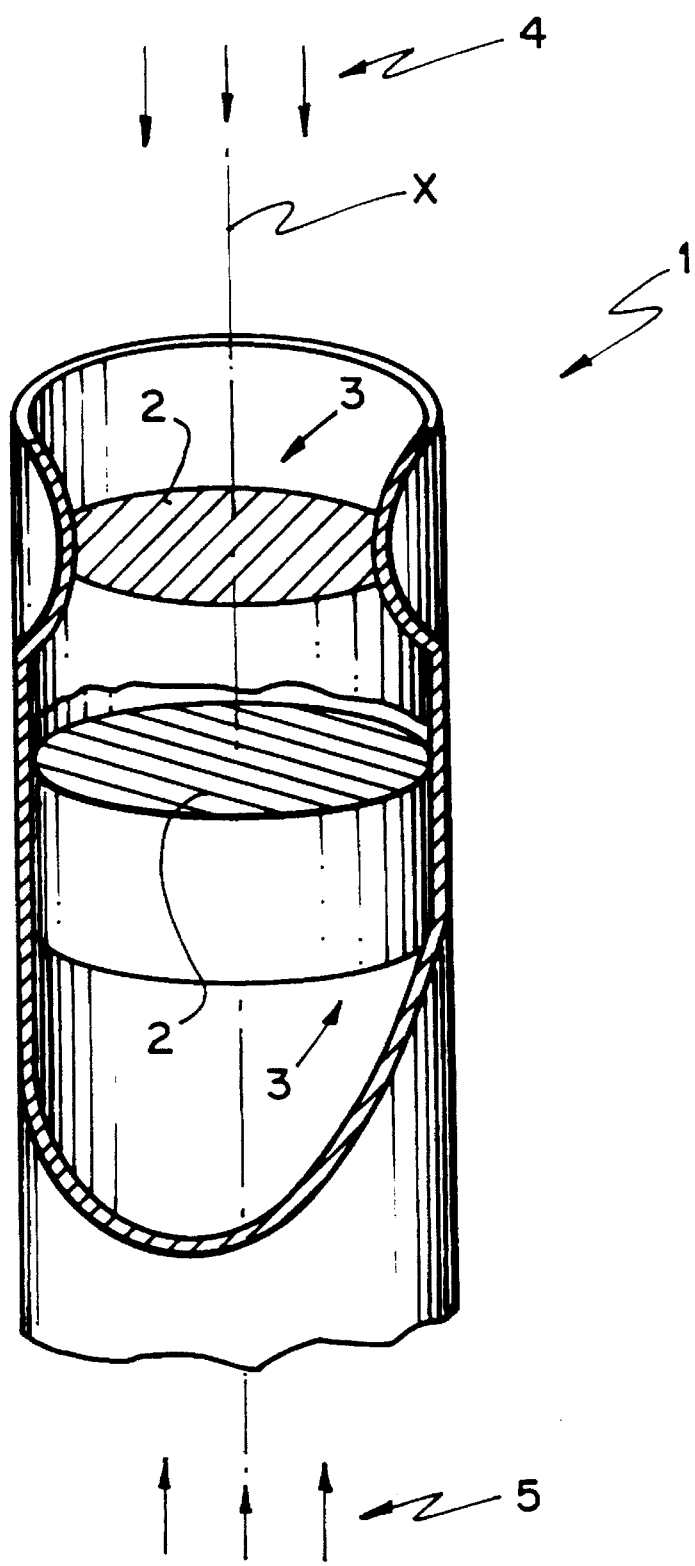
FIG. 1 is an isometric view, partially cut away, of a reaction chamber containing a stack of packing elements.

Referring to FIG. 1, a generally cylindrical reaction chamber 1 (e.g., a washing column or a distilling tower) carries two fluid streams that are meant to be mixed and to react within chamber 1. One of the fluid streams (e.g., a liquid) is introduced into chamber 1 by a sprayer (not shown) and falls in a predominant direction of flow 4. A reboiler (also not shown) introduces the other fluid stream (e.g. a gas), which rises in the opposite predominant direction of flow 5.

A stack of identical, generally cylindrical packing elements 3 (of which two are shown) inside chamber 1 enhance the mixing of and reaction between the fluid streams in a manner described in detail below. The vertical axis X of each packing element 3 is aligned with the predominant flow directions 4, 5.

Each packing element 3 includes a series of layers 2, each in contact with one or more adjacent layers 2. All layers 2 have the same height and thickness, but the width of layers 2 varies to make the overall shape of packing element 3 generally cylindrical to fit tightly within chamber 1. Layers 2 of adjacent, stacked packing elements 3 need not be angularly aligned with each other. Typically, adjacent packing elements 3 are placed in chamber 1 with their layers 2 oriented perpendicularly to each other. A pair of packing elements 3 can be fabricated as a unit (i.e., secured together), with layers 2 of the constituent packing elements 3 oriented at the desired angular relationship, and the unit installed in chamber 1. Adjacent units of layers 2 (or adjacent layers 2) can be keyed to ensure that the desired angular relationship is established.

Figure 2:
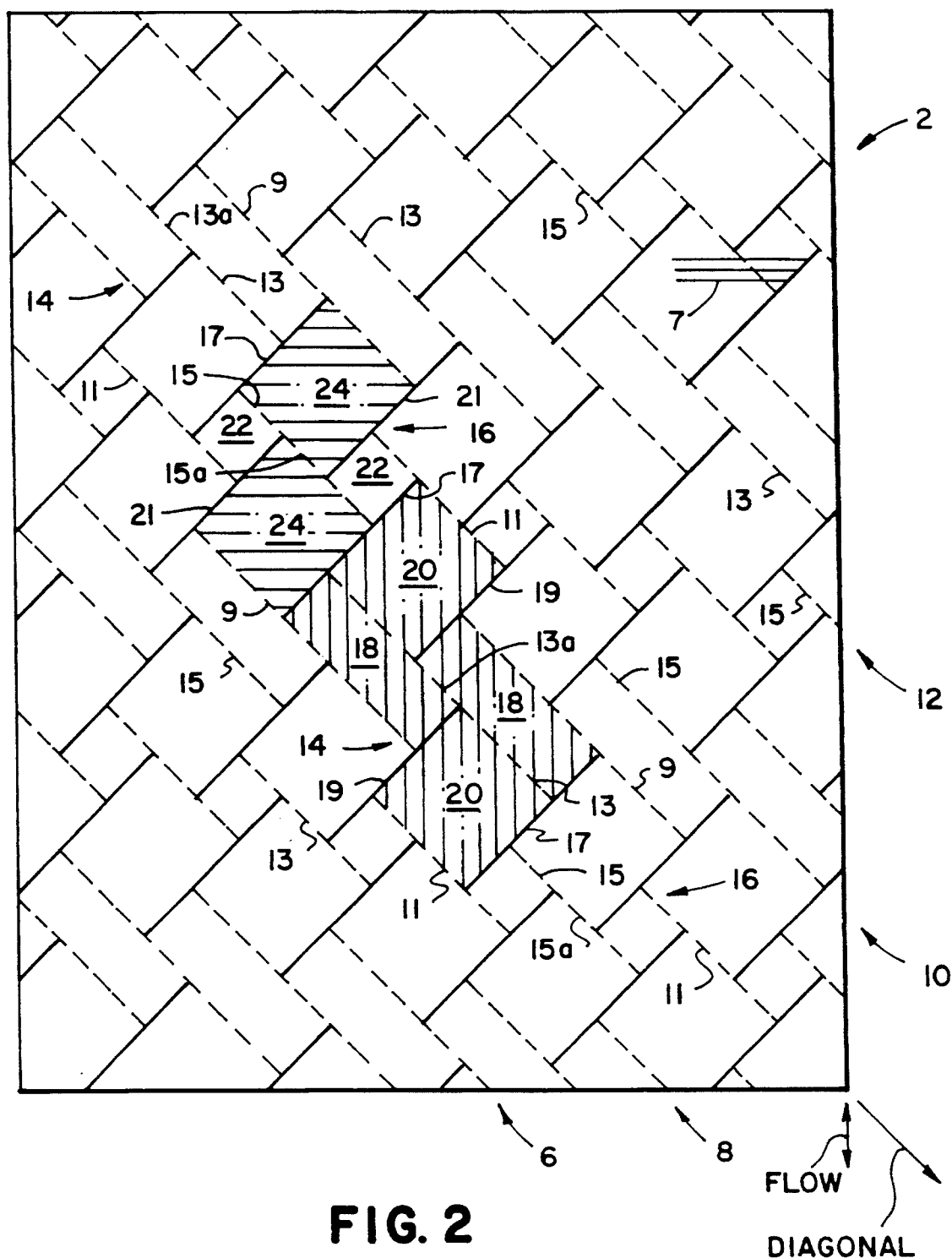
FIG. 2 is a plan view of one embodiment of a layer used in the packing elements.
Figure 3:
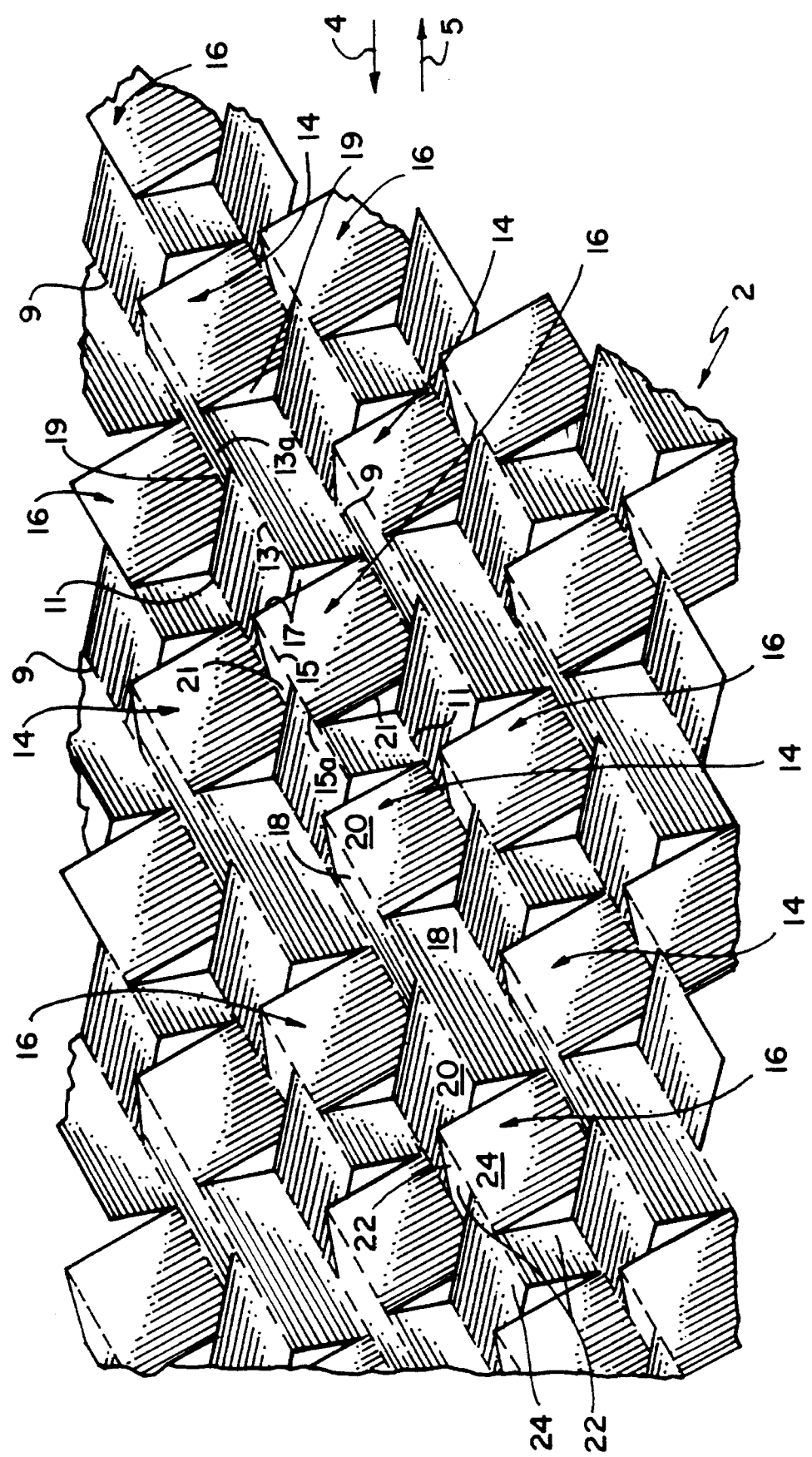
FIG. 3 is a perspective view of the layer of FIG. 2.

Referring to FIGS. 2 and 3, packing element layer 2 is shown in detail. Packing element layer 2 includes a plurality of staggered rows (e.g., rows 6, 8, 10, 12) of corrugations 14, 16 that project out of the plane of layer 2 for deflecting the fluids. Rows 6, 8, 10, 12 are disposed in parallel, staggered fashion and are oriented diagonally with respect to the opposing directions of flow 4, 5 of the fluids (and with respect to axis X). As explained in detail below, corrugations 14, 16 have different configurations and alternate with each other along the length of each row 6, 8, 10, 12. Generally, however, each corrugation 14 includes an elongated, diagonal vertex 13, and each corrugation 16 includes a shorter elongated, diagonal vertex 15 (vertices 13, 15 are indicated by dotted lines in FIG. 2).

As is particularly evident from FIG. 3, vertices 13, 15 of rows 6, 8, 10, 12 are all coplanar and form a series of diagonal "ridges" in layer 2. Rows 6, 8, 10, 12 of corrugations 14, 16 also define a series of elongated, diagonal vertices 9, 11 between vertices 13, 15 of adjacent rows 6, 8, 10, 12. Vertices 9, 11 are parallel to vertices 13, 15, but are disposed on the opposite side of a central plane of layer 2. Vertices 9, 11 are all coplanar and form a series of diagonal "valleys" in layer 2. The plane of vertices 13, 15 and the plane of vertices 9, 11 are equidistant from the central plane of layer 2. Vertices 9, 11, 13, and 15 are oriented at 45 degrees to flow directions 4, 5.

Rows 6, 8, 10, 12 of corrugations 14, 16 are arranged so that elongated vertices 13, 15 in each row 6, 8, 10, 12 are progressively staggered from each other along the length of the row and are parallel to vertices 13, 15 of the other rows 6, 8, 10, 12. That is, a vertex 13 of a corrugation 14 is displaced in a direction perpendicular to the diagonal relative to a vertex 15 of an adjacent corrugation 16. (It is apparent that vertices 9, 11 are staggered in the same manner.)

Each corrugation 14 is formed from two pairs 18, 20 of planar, oppositely-inclined fluid deflection surfaces that converge at vertex 13. Surfaces 18, 20 have different angles of inclination with respect to the plane of layer 2—surfaces 18 are inclined relatively steeply to the plane of layer 2, while surfaces 20 are inclined more shallowly (ranges of inclination are discussed below). The relative positions of inclined surfaces 18, 20 are reversed on opposite sides of vertex 13—that is, on one side of vertex 13 a shallowly inclined surface 20 is followed by a more steeply inclined surface 18 along the length of the row, while on the opposite side of vertex 13 a steeply inclined surface 18 is followed by a shallowly inclined surface 20. Inclined surfaces 18 are longer (as measured along the diagonal) than inclined surfaces 20 and meet each other along a shared, central region 13a of vertex 13. It is apparent that central region 13a provides an offset between oppositely-inclined surfaces 18 and between oppositely-inclined surfaces 20 along the diagonal of vertex 13.

Two pairs 22, 24 of planar, oppositely-inclined fluid deflection surfaces that meet at vertex 15 define each corrugation 16. As is the case with corrugations 14, surfaces 22 are inclined more steeply with respect to the plane of layer 2 than are surfaces 24, and the relative positions of inclined surfaces 22, 24 are reversed on opposite sides of vertex 15. Surfaces 24 are the same length (and surface area) as surfaces 20. Inclined surfaces 24 are longer than inclined surfaces 22 and meet each other along a shared, central region 15a of vertex 15 (see also FIG. 2). Central region 15a provides an offset between oppositely-inclined surfaces 22 and between oppositely-inclined surfaces 24 along the diagonal of vertex 15.

An aperture 17 is disposed between adjacent corrugations 14, 16 of each row 6, 8, 10, 12. In addition, corrugations 14 include a pair of apertures 19 at the junctions between adjacent inclined surfaces 18, 20. Another pair of apertures 21 are disposed between adjacent inclined surfaces 22, 24 of each corrugation 16. Apertures 17, 19, 21 are all perpendicular to vertices 13, 15 (and hence are perpendicular to the diagonals defined by rows 6, 8, 10, 12). Corrugations 14, 16 form the liquid drip edges discussed above at apertures 17, 19, 21; in addition, apertures 17, 19, 21 provide passages for upward gas flow through the packing elements. The staggering of vertices 13, 15 and the offsets provided by shared vertex regions 13a, 15a provide a corresponding stagger and offset between apertures 17, 19, 21, thereby reducing resistance to upward gas flow and increasing throughput.

Surfaces 20 of corrugations 14 and surfaces 24 of corrugations 16 define identical inclination angles with respect to the plane of layer 2. Likewise, surfaces 18 of corrugations 14 are inclined identically to surfaces 22 of corrugations 16. In general, surfaces 20, 24 have an inclination angle between 7.5 degrees and 37.5 degrees, and preferably 15 degrees. The inclination of surfaces 18, 22 ranges between 52.5 degrees and 80 degrees, and is preferably 65 degrees.

The relative angles of inclination of surfaces 18, 20, 22, 24 may be varied as desired to adjust mixing efficiency and throughput. For example, varying the relative inclinations of surfaces 18, 20 alters the size of apertures 19. Likewise, the size of apertures 21 is changed by varying the inclination of surfaces 22 relative to that of surfaces 24. Changing the relative inclination of surfaces 18, 20, 22, 24 also affects the amount of "stagger" between adjacent vertices 13, 15 (and hence, the size of apertures 17) and the height between "ridge" vertices 13, 15 and "valley" vertices 9, 11. This, in turn, alters the path of the fluid across layer 2.

For example, the amount of staggering of layer 2 shown in FIGS. 2 and 3 can be decreased by "compressing" layer 2 in a direction perpendicular to the diagonal. Such compression, by altering the inclination angles of surfaces 18, 20, 22, 24, affects the degree of deflection of fluid from the surface of layer 2. The compression also alters the shapes of apertures 17, 19, 21, thereby also affecting the rate of gas migration through layer 2.

The relative lengths of inclined surfaces 18, 20, 22, 24 (along respective vertices 13, 15) can be varied in order to optimize fluid dispersion, pressure of gas flow, and durability of the layer. For example, the length of surfaces 18 is 1.5 times that of surfaces 20, while surfaces 22 are one-half of the length of surfaces 24. Thus, if surfaces 20, 24 are one inch long, surfaces 18, 22 have lengths of 1.5 inches and one-half inch, respectively. The height between "ridge" vertices 13, 15 and "valley" vertices 9, 11 is preferably one-half inch.

The lengths of shared regions 13a, 15a of vertices 13, 15 are preferably equal to each other. For example, shared regions 13a, 15a are each one-half inch long. These relatively long shared regions 13a, 15a render layer 2 relatively structurally strong, and reduce the possibility of layer 2 twisting at shared regions 13a, 15a. Shared regions 13a, 15a can, of course, be made longer or shorter, as desired. Making regions 13a, 15a longer reduces the offset between surfaces 24 and between surfaces 18, thereby making these pairs of surfaces nearly aligned. If regions 13a, 15a are made shorter, on the other hand, the degree of offset between the surfaces is increased, but layer 2 is made structurally weaker.

Figure 4:
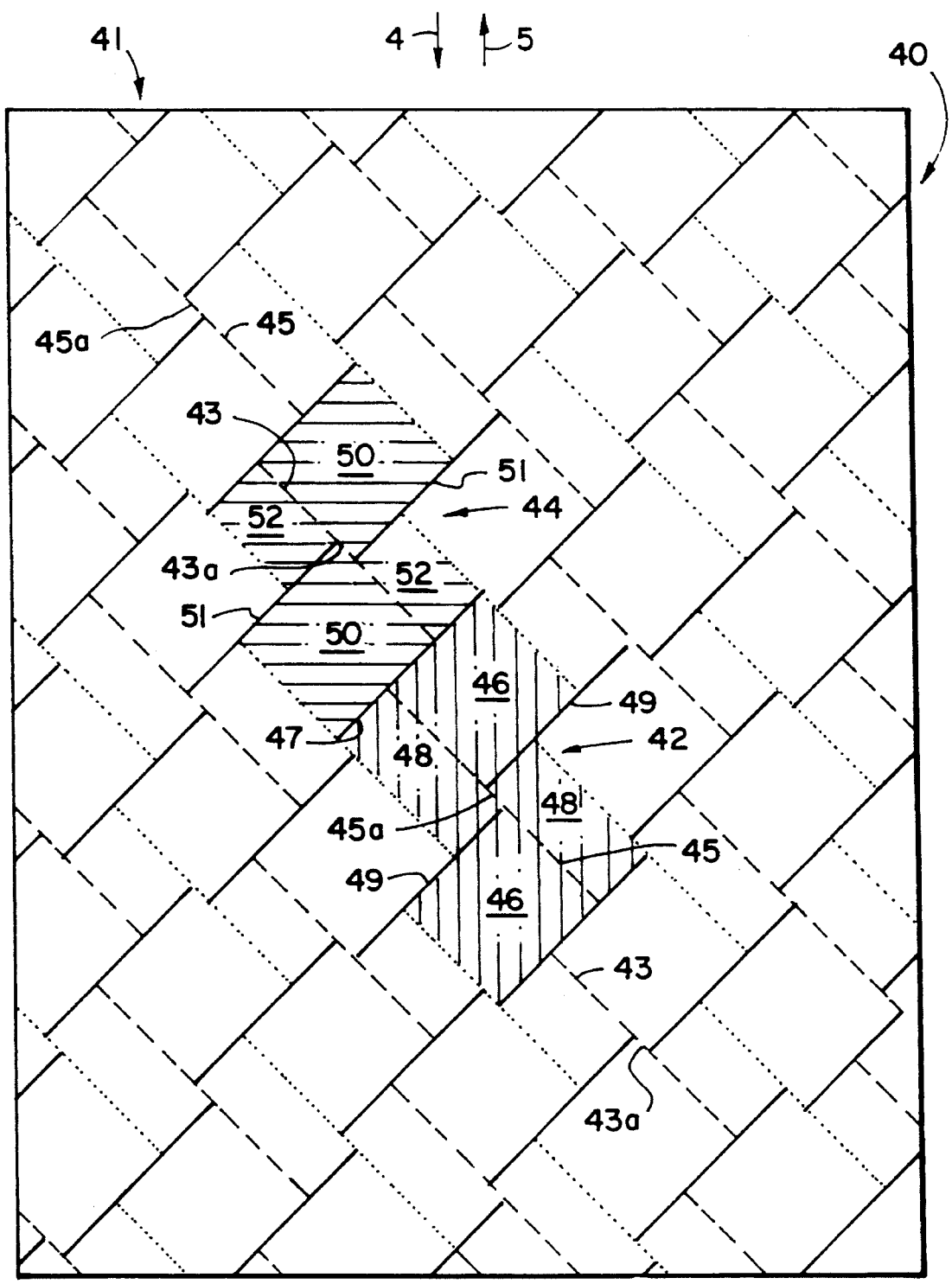
FIG. 4 is a plan view of another embodiment of a layer used in the packing elements.
Figure 5:
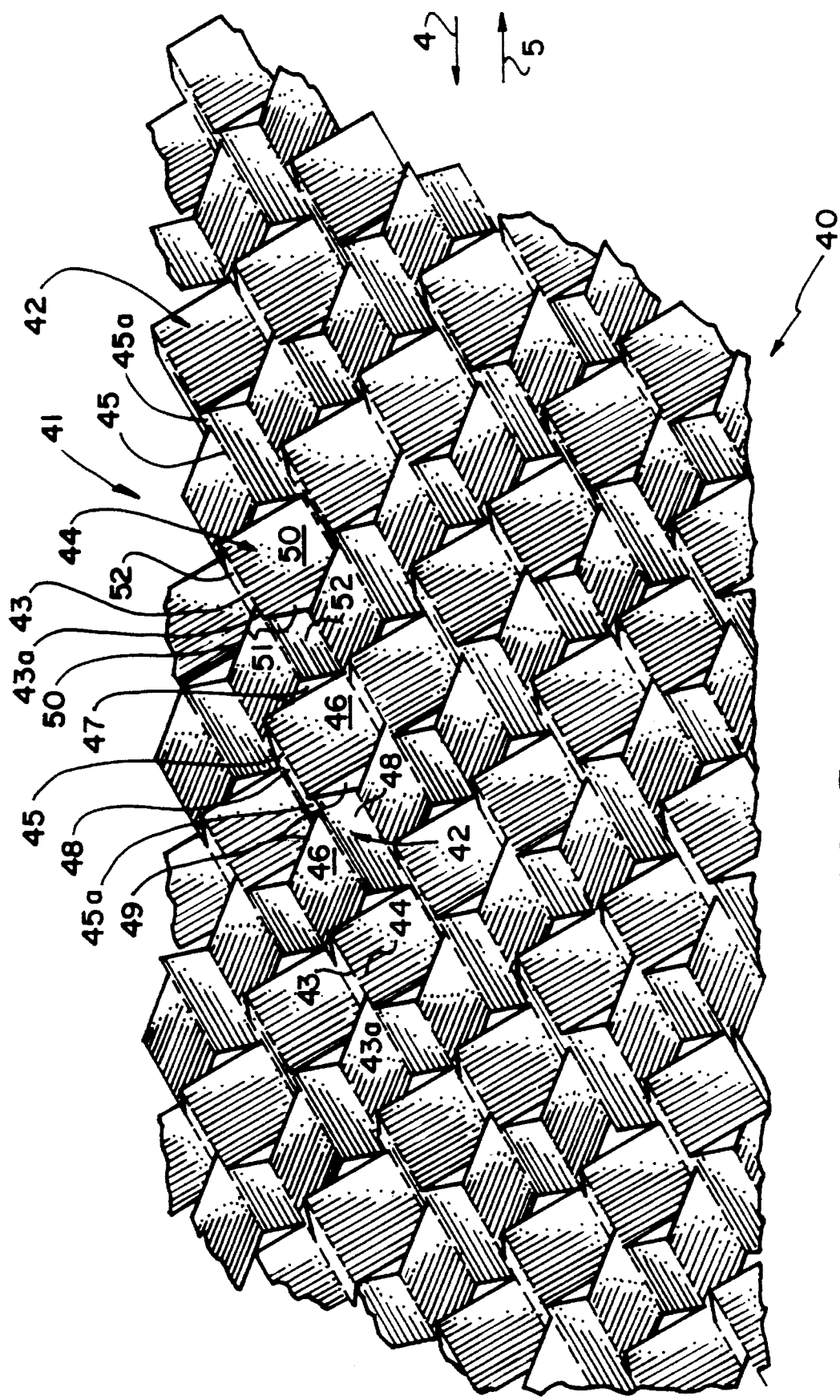
FIG. 5 is a perspective view of the layer of FIG. 4.

For example, referring to FIGS. 4 and 5, packing element layer 40 has shared regions of vertices that are only half as long as shared regions 13a, 15a (e.g., one-quarter inch). More specifically, each diagonal row (only one of which, row 41, is identified) includes alternating corrugations 42, 44 that are identical to corrugations 14, 16 in all respects other than the relative lengths of shallowly inclined surfaces 46, 50 and steeply inclined surfaces 48, 52. In this embodiment, surfaces 48 are 1.25 times the length of surfaces 46, and surfaces 52 are 0.75 of the length of surfaces 50.

The regions 43a of diagonal vertices 43 shared by surfaces 50 are one-quarter of the length of surfaces 50. Likewise, regions 45a of diagonal vertices 45 shared by surfaces 48 are one-quarter of the length of surfaces 46. (Surfaces 46, 50 have equal lengths.)

As with layer 2, each diagonal row of layer 40 includes a series of apertures oriented perpendicularly to diagonal vertices 43, 45. More specifically, aperture 47 is disposed between adjacent corrugations 42, 44. Apertures 49 are formed at the boundaries between differently-inclined surfaces 46, 48 in corrugations 42. Within corrugations 44, apertures 51 are positioned between differently-inclined surfaces 50, 52.

Although the shorter lengths of shared regions 43a, 45a reduce the structural strength of layer 40 relative to that of layer 2, the reduction in length provides a shorter channel width than that provided by shared regions 13a, 15a (FIG. 2). As a result, less liquid is transported across the channels provided by shared regions 43a, 45a than is transported across the larger shared regions 13a, 15a.

Packing element layers 2, 40 are made in any suitable way. One manufacturing technique is described in the Parent Application. Another is discussed in my U.S. Pat. No. 5,063,000, entitled "Structured Packing Elements" and incorporated herein by reference.

For example, layer 2 is made from, e.g., a sheet of metal, which preferably includes fine fluting 7 (shown in only a small region of layer 2 for clarity) that runs horizontally with respect to the diagonal rows of corrugations. Slits, which will define apertures 17, 19, 21 are cut. By "slit," I mean to include both a narrow cut through the layer and a cut in which a finite amount of material of the layer is removed. In general, however, each slit should have no more material removed than is necessary for convenience in manufacturing or than is necessary to avoid adjacent corrugations in a row (e.g., corrugations 14, 16 of layer 2) from encroaching on each other. After all slits have been cut, layer 2 is progressively creased along the respective diagonal vertices 9, 11, 13, 15 to define the diagonal rows 6, 8, 10, 12 of corrugations 14, 16. Layer 40 is manufactured in a similar way.

A structured packing element 3 (FIG. 1) is made from a series of layers 2 (or a series of layers 40) in the same way as described in the Parent Application and in the above-referenced U.S. patent. Generally, adjacent layers 2 are arranged so that their respective rows 6, 8, 10, 12 of corrugations are oriented in opposite diagonal directions. As a result, the "valley" vertices 9, 11 of one layer 2 will cross and contact the "ridge" vertices 13, 15 of the adjacent layer 2. These contact points promote turbulence in the flowing liquid and gas, thereby further encouraging mixing, as well as the exchange of fluid between layers 2. (Layers 40 are similarly arranged in a packing element 3.)

The configurations of layers 2, 40 provide several advantages. For example, as shown in FIG. 2, the configurations of corrugations 14, 16 results in portions of apertures 17, 19, 21 being vertically aligned with each other. (The same is true with apertures 47, 49, 51 of layer 40.) As a result, each layer 2, 40 provides nearly vertical channels for gas flow through packing element 3, which increases mixing throughput and decreases the gas pressure drop in column 1.

In addition, configuring corrugations 14, 16, 42, 44 with differently inclined surfaces which are offset from each other along the vertices of the corrugations provides numerous drip edges. This is particularly useful at low liquid flow rates, because the liquid will collect along the drip edges and then become redispersed at the point in which the drip edge ends. This redispersal improves mixing efficiency.

Moreover, the staggered nature of corrugations 14, 16, 42, 44 provides frequent breaks in the liquid flow path (and concomitant interruptions in boundary layers), which in turn reduces the tendency of the liquid and the gas to "channel" along the valleys.

Other Embodiments

Other embodiments are within the scope of the following claims.

For example, the relative lengths of the inclined corrugation surfaces can be different from those discussed above, as may the lengths of the shared regions of the vertices. The inclinations of the corrugation surfaces may also be adjusted according to the mixing application, to promote the desired balance between mixing efficiency and throughput. The diagonal angle of the corrugation vertices may also be varied.

I have found other highly suitable configurations for structured packing element layers.

Figure 6:
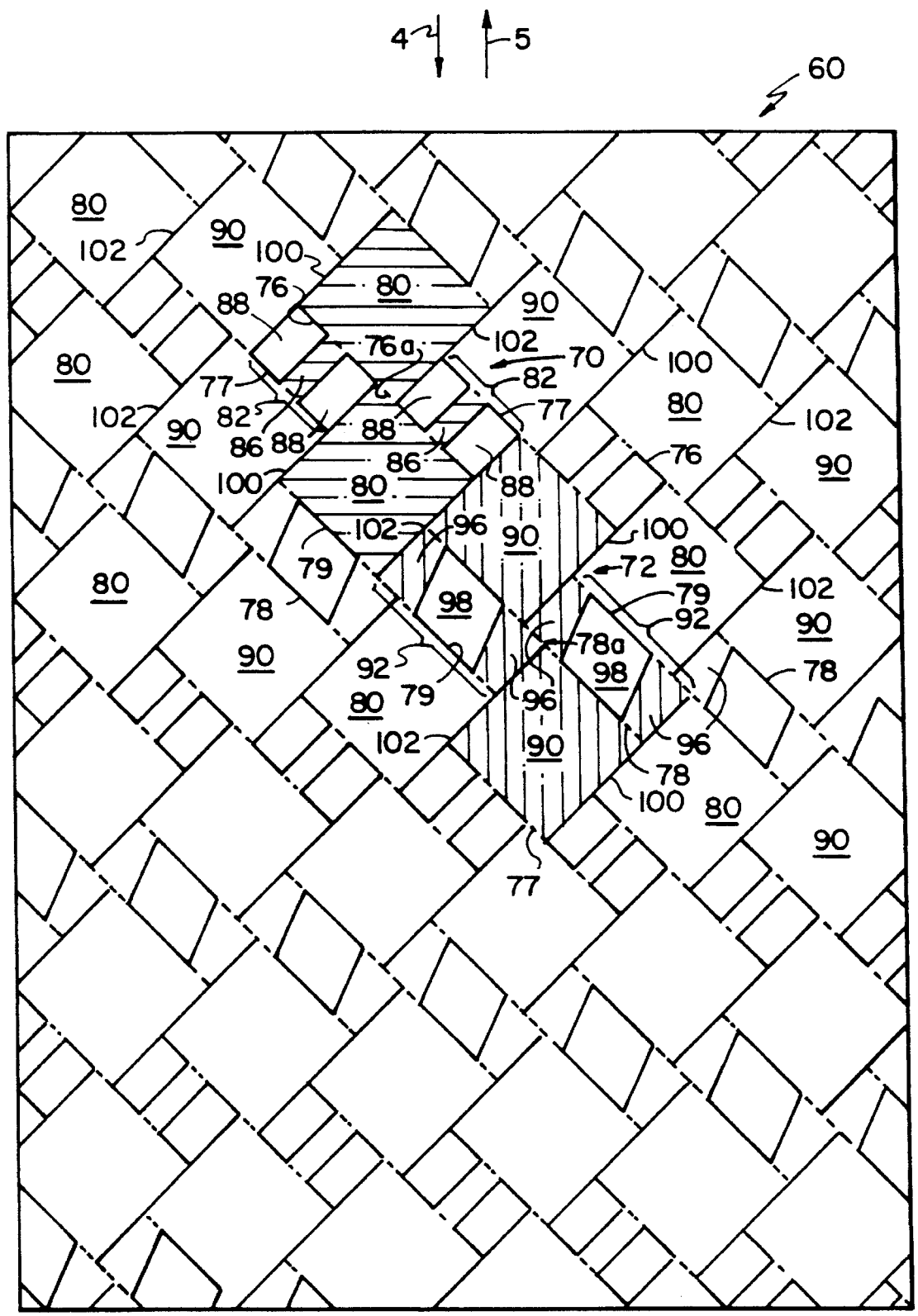
FIG. 6 shows the surface layout of still another embodiment of a layer used in the packing elements.
Figure 7:
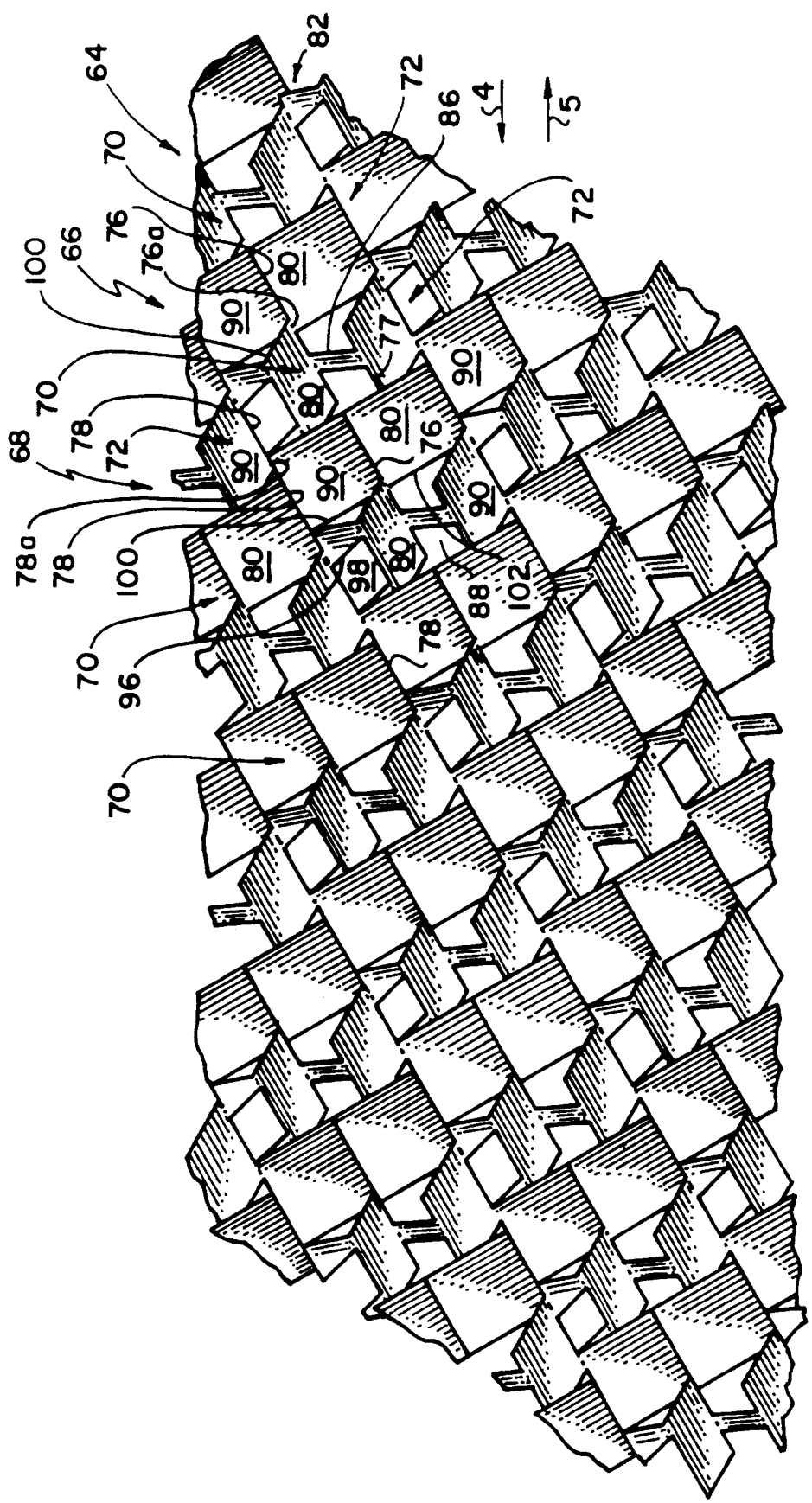
FIG. 7 is a perspective view of the layer of FIG. 6.

For example, referring to FIGS. 6 and 7, layer 60 includes diagonal rows (rows 62, 64, 66, and 68 are identified) of two types of corrugations 70, 72 that are configured somewhat differently from the corrugations of layers 2, 40. For one thing, each row 62, 64, 66, and 68 includes only one type of corrugation 70, 72, and the types of corrugations alternate among the rows. For example, rows 64 and 68 include corrugations 70, while corrugations 72 are arranged in rows 62 and 66. Moreover, corrugations 70, 72 are not staggered along the diagonals of the respective rows 62, 64, 66, 68.

That is, elongated vertices 76 of corrugations 70 are all aligned with each other in row 64 and in row 68. Likewise, elongated vertices 78 of corrugations 72 are aligned with each other along the diagonals of rows 62, 66.

FIG. 6 shows the surface layout of corrugations 70, 72. Note that FIG. 6 depicts layer 60 lying flat, before layer 60 is creased to form corrugations 70, 72. Also note that the layout shown in FIG. 6 resembles that shown in FIG. 4, in the following way. Each corrugation 70 includes a pair of relatively large, elongated surfaces 80 disposed on opposite sides of vertex 76 and that meet each other along a shared region 76a of vertex 76. (Each surface 80 is the same size as surfaces 46, 50 of layer 40.) Disposed diagonally adjacent to each surface 80 is a region 82 that is generally the same area as a surface 52 of layer 40. In contrast to layer 40, however, each region 82 is cut-out to define a rectangular tab 86 between a pair of rectangular holes 88. Tabs 86 are disposed on opposite sides of vertex 76. Each tab 86 interconnects a vertex 78 of a surface 80 to a vertex 79 of a surface 90 (discussed below) belonging to a corrugation 72 in an adjacent row.

Each corrugation 72 likewise includes a pair of relatively large, elongated surfaces 90 (which are identical in size to surfaces 80) disposed on opposite sides of vertex 78. A pair of regions 92 are positioned diagonally adjacent to surfaces 90, as shown. (Regions 92 have generally the same area as surfaces 48 of layer 40.) Regions 92 are cut-out somewhat differently than regions 82 to provide a rhomboid-shaped central hole 98 between a pair of rhomboidal tabs 96. The respective pairs of tabs 96 are disposed on opposite sides of vertex 78. In a corrugation 72 of any given row (e.g., row 62), two of the opposing tabs 96 meet each other along a shared region 78a of vertex 78, and have opposite ends that are attached to vertices 79 of surfaces 80 in an adjacent row. The other two tabs 96 interconnect surfaces 90 to tabs 96 of other surfaces 90 in row 62.

Layer 60 is made by first cutting out openings 88, 98 (such as by stamping), and also cutting slits 100, 102 between surfaces 80, 90. Layer 60 is then creased at vertices 76, 77, 78, 79, and corrugations 70, 72 are formed by compressing layer 60 perpendicularly to vertices 76, 77, 78, 79 until diagonal rows 62, 64, 66, 68 of corrugations 70, 72 are formed (FIG. 7).

In each row containing corrugations 70 (e.g., rows 64, 68), opposing surfaces 80 of corrugations 70 are inclined at opposite, relatively shallow angles with respect to the plane of layer 60 (e.g., between 20 degrees and 60 degrees, and preferably 30 degrees). Each surface 80 extends between a vertex 79 and a vertex 76, and the opposing surfaces 80 of a given corrugation 70 converge at a vertex 76. Note that oppositely-inclined surfaces 80 are highly offset from each other along vertex 76, and that openings 88 provide large apertures for upward gas flow through the packing element.

Tabs 86 are oriented nearly perpendicularly to the plane of layer 60, and extend between vertices 76 and vertices 77. Tabs 86 provide a bridge or channel for the exchange of fluid between adjacent rows 62, 64, 66, 68 of corrugations. Edges of surfaces 80 at apertures 100, 102, as well as the edges of tabs 86, define the drip edges discussed above.

In each row that contains corrugations 72 (e.g., rows 62, 66), opposing surfaces 90 of corrugations 72 are inclined at opposite angles (equal to the inclinations of surfaces 80) with respect to the plane of layer 60. Each surface 90 extends between a vertex 77 and a vertex 78, where opposing surfaces 90 converge. In each corrugation 72, surfaces 90 are spaced from each other along the diagonal length of vertex 78 by tabs 96, and thus are highly offset. Openings 98 provide large spaces for gas flow. Tabs 96 extend perpendicularly between vertices 78 and vertices 79, and provide fluid-exchange paths between surfaces 90 and between adjacent rows 62–68 of corrugations. Edges of surfaces 90 at apertures 100, 102, as well as the edges of tabs 96, define the drip edges discussed above.

The structural stiffness of the material from which layer 60 is made (e.g., metal) should enable layer 60 to maintain its corrugated shape without the need for fasteners to hold corrugations 70, 72 in place. However, if necessary, tabs 96 may be fastened together in any suitable way to help hold the shape of layer 60 (e.g., by punching ragged-edge holes through tabs 96 such that the ragged edges of the holes tack the tabs together). It will be appreciated from the above discussion that all vertices 76, 78 are coplanar with each other, as are all vertices 77, 79. The planes in which vertices 76, 78 and vertices 77, 79 lie are on opposite sides of a central plane of layer 60 and are spaced by the height of tabs 86, 96 (e.g., one-half inch).

A packing element 3 (FIG. 1) is fashioned from layers 60 in much the same way as discussed above. Adjacent layers 60 are oriented so that their corrugations 70, 72 are arranged in opposite diagonal directions. As a result, vertices 76, 78 of one layer 60 cross and contact vertices 77, 79 of an adjacent layer 60.

Among other advantages, packing element layer 60 provides still further enhancement of the vertical gas flow paths. That is, the additional openings in layer 60 that holes 88, 98 provide vertical gas flow paths that are even more unencumbered than those provided by layers 2, 40. In addition, overall mixing efficiency is increased because the vapor, flowing up a row 62–68, is continually intercepted by the zigzag elements. Overall liquid mixing efficiency is also increased because the liquid will enter a zigzag element from the vertical packing element at its upstream end, will be dispersed by the horizontal flutes on the surface of layer 60, and will be concentrated as the liquid leaves the element through the vertical packing element at its downstream end. The frequent remixing of the gas with the liquid due to the continual flow of the gas through openings 88, 98 also improves mixing.

Still other embodiments are within the scope of the claims.

I claim:

1. A packing element for enhancing contact between a first fluid having a predominant direction of flow and a second fluid, comprising:

a plurality of adjacently disposed layers of material, each of which is disposed generally in a plane aligned with said direction of flow;

each one of said layers having a plurality of rows of corrugations projecting out of said plane for deflecting said first fluid and said second fluid, each one of said corrugations including a pair of surfaces that are oppositely inclined with respect to said plane and that define an elongated vertex oriented in a diagonal direction with respect to said predominant direction of flow;

each one of said corrugations being configured so that said pair of surfaces are at least partially offset from each other along said diagonal direction;

said pair of surfaces being in alignment with each other along said diagonal direction at a shared region of said elongated vertex, said shared region being a selected portion of a length of said pair of surfaces.

2. The packing element of claim 1 wherein each said row of corrugations is arranged so that the diagonal directions of the elongated vertices of at least some said corrugations in said row are in alignment with each other.

3. The packing element of claim 1 wherein said shared region is one-half of said length.

4. The packing element of claim 1 wherein said shared region is one-quarter of said length.

5. The packing element of claim 1 wherein each said row of corrugations is arranged so that the diagonal directions of the elongated vertices of at least some of said corrugations in said row are staggered from each other.

6. A packing element for enhancing contact between a first fluid having a predominant direction of flow and a second fluid, comprising:

a plurality of adjacently disposed layers of material, each of which is disposed generally in a plane aligned with said direction of flow;

each one of said layers having a plurality of rows of corrugations projecting out of said plane for deflecting said first fluid and said second fluid, each one of said corrugations including a pair of surfaces that are oppositely inclined with respect to said plane and that define an elongated vertex oriented in a diagonal direction with respect to said predominant direction of flow;

each one of said corrugations being configured so that said pair of surfaces are at least partially offset from each other along said diagonal direction;

each said row of corrugations being arranged so that the diagonal directions of the elongated vertices of at least some of said corrugations in said row are staggered from each other; and each one of said corrugations also comprising a second pair of oppositely-inclined surfaces that define said elongated vertex, said second pair of surfaces having a different inclination with respect to said plane than the first-mentioned pair of surfaces.

7. The packing element of claim 6 wherein said layer further comprises apertures disposed between said corrugations in each one of said rows and between said first and second surfaces of each one of said corrugations, said rows of corrugations being staggered so that at least some of said apertures are vertically aligned.

8. The packing element of claim 6 wherein said second pair of surfaces are offset from each other by said first pair of surfaces.

9. The packing element of claim 6 wherein the lengths of said second pair of surfaces along said diagonal direction are different in adjacent ones of said corrugations in each said row.

10. The packing element of claim 9 wherein the lengths of said second pair of surfaces of a first one of said corrugations in each said row exceed the lengths of said first pair of surfaces of said first corrugation.

11. The packing element of claim 10 wherein the lengths of said second pair of surfaces of a second one of said corrugations adjacent to said first corrugation are less than the lengths of said first pair of surfaces of said second corrugation.

12. The packing element of claim 10 wherein corrugations having the configuration of said first corrugation alternate with corrugations having the configuration of said second corrugation in each one of said rows.

13. The packing element of claim 6 wherein said second pair of surfaces are more steeply inclined than said first pair of surfaces with respect to said plane.

14. The packing element of claim 13 wherein said first pair of surfaces are inclined at between 7.5 degrees and 37.5 degrees.

15. The packing element of claim 13 wherein said second pair of surfaces are inclined at between 52.5 degrees and 80 degrees.

16. A packing element for enhancing contact between a first fluid having a predominant direction of flow and a second fluid, comprising:

a plurality of adjacently disposed layers of material, each of which is disposed generally in a plane aligned with said direction of flow;

each one of said layers having a plurality of rows of corrugations projecting out of said plane for deflecting said first fluid and said second fluid, each one of said corrugations including a pair of surfaces that are oppositely inclined with respect to said plane and that define an elongated vertex oriented in a diagonal direction with respect to said predominant direction of flow;

each one of said corrugations being configured so that said pair of surfaces are at least partially offset from each other along said diagonal direction;

each said row of corrugations being arranged so that the diagonal directions of the elongated vertices of all of said corrugations in said row are in alignment with each other.

17. A packing element for enhancing contact between a first fluid having a predominant direction of flow and a second fluid, comprising:

a plurality of adjacently disposed layers of material, each of which is disposed generally in a plane aligned with said direction of flow;

each one of said layers having a plurality of rows of corrugations projecting out of said plane for deflecting said first fluid and said second fluid, each one of said corrugations including a pair of surfaces that are oppositely inclined with respect to said plane and that define an elongated vertex oriented in a diagonal direction with respect to said predominant direction of flow;

each one of said corrugations being configured so that said pair of surfaces are at least partially offset from each other along said diagonal direction;

each said row of corrugations being arranged so that the diagonal directions of the elongated vertices of at least some said corrugations in said row are in alignment with each other; and each one of said corrugations also comprising a pair of oppositely-inclined elements having a different inclination with respect to said plane than said pair of surfaces, each one of said elements defining at least one opening through said corrugation for passage of said second fluid.

18. The packing element of claim 17 wherein said pair of elements are offset from each other by said pair of surfaces.

19. The packing element of claim 17 wherein the length of each one of said elements is less than the length of each one of said pair of surfaces.

20. The packing element of claim 19 wherein at least some of said elements include a single member having a pair of said openings disposed on each side thereof along said diagonal direction.

21. The packing element of claim 19 wherein at least some of said elements include a pair of members disposed on opposite sides of a said opening along said diagonal direction.

22. The packing element of claim 17 wherein said pair of surfaces of each one of said corrugations are inclined at an acute angle with respect to said plane, and said elements are oriented perpendicularly to said plane.

23. The packing element of claim 22 wherein said pair of surfaces are inclined at between 20 degrees and 60 degrees.

24. A packing element for enhancing contact between a first fluid having a predominant direction of flow and a second fluid, comprising:

a plurality of adjacently disposed layers of material, each of which is disposed generally in a plane aligned with said direction of flow;

each one of said layers having a plurality of rows of corrugations projecting out of said plane for deflecting said first fluid and said second fluid, each one of said corrugations including two pairs of surfaces that are oppositely inclined with respect to said plane and that define an elongated vertex oriented in a diagonal direction with respect to said predominant direction of flow;

the surfaces in each of said pairs being at least partially offset from each other along said diagonal direction; and said pairs of surfaces having different lengths along said diagonal direction and having different inclinations with respect to said plane.

25. The packing element of claim 24 wherein each said row of corrugations is further arranged so that the diagonal directions of the elongated vertices of all of said corrugations in said row are staggered from each other.

26. A packing element for enhancing contact between a first fluid having a predominant direction of flow and a second fluid, comprising:

a plurality of adjacently disposed layers of material, each of which is disposed generally in a plane aligned with said direction of flow;

each one of said layers having a plurality of rows of corrugations projecting out of said plane for deflecting said first fluid and said second fluid, each one of said corrugations including a pair of surfaces that are oppositely inclined with respect to said plane and that define an elongated vertex oriented in a diagonal direction with respect to said predominant direction of flow, said pair of surfaces being at least partially offset from each other along said diagonal direction, and a pair of oppositely-inclined elements disposed adjacent to said pair of surfaces and having a different inclination with respect to said plane than said pair of surfaces, each one of said elements defining at least one opening through said corrugation for passage of said second fluid.

27. The packing element of claim 26 wherein said pair of surfaces of each one of said corrugations are inclined at an acute angle with respect to said plane, and said elements are oriented perpendicularly to said plane.

28. The packing element of claim 26 wherein each said row of corrugations is arranged so that the diagonal directions of the elongated vertices of all of said corrugations in said row are in alignment with each other.

* * * * *